(12) United States Patent
Kitamorn et al.

(10) Patent No.: US 6,345,369 B1
(45) Date of Patent: *Feb. 5, 2002

(54) ENVIRONMENTAL AND POWER ERROR HANDLING EXTENSION AND ANALYSIS FOR SYSTEMS WITH REDUNDANT COMPONENTS

(75) Inventors: Alongkorn Kitamorn, Austin; Charles Andrew McLaughlin, Round Rock; Kanisha Patel, Cedar Park; Donald LeRoy Thorson, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/190,559

(22) Filed: Nov. 12, 1998

(51) Int. Cl.$^7$ .................................................. G06F 11/16
(52) U.S. Cl. ............................ 714/14; 714/25; 702/132
(58) Field of Search ........................... 714/46, 47, 25, 714/37, 14, 22, 4; 702/132, 130, 131, 122, 116; 709/224; 370/216, 242; 340/501, 540, 584; 713/300

(56) References Cited

U.S. PATENT DOCUMENTS

| | | | |
|---|---|---|---|
| 4,803,592 A | * | 2/1989 | Ashley |
| 4,881,230 A | * | 11/1989 | Clark et al. |
| 5,878,377 A | * | 3/1999 | Hamilton, II et al. |
| 6,035,416 A | * | 3/2000 | Abdelnour et al. |
| 6,044,476 A | * | 3/2000 | Ote et al. |

\* cited by examiner

*Primary Examiner*—Gopal C. Ray
(74) *Attorney, Agent, or Firm*—Sawyer Law Group LLP; Leslie Van Leeuwen

(57) ABSTRACT

Aspects for detecting environmental faults in redundant components of a computer system are described. In an exemplary method aspect, the method includes monitoring system environment conditions, including a status for redundant power supply and cooling components. The method further includes registering a failure condition with an appropriate error type when a monitored system environment condition exceeds a design threshold, and utilizing the registered failure condition as data in an architected error log.

23 Claims, 7 Drawing Sheets

EPOW Check-Exception RTAS Functional Description:

1) Read EPOW register byte 0 (ISA 0x855)

2) Data in EPOW-code field go to EPOW sensor value (low-order 4 bits of byte 12-15, extended error log EPOW format).

3) If the value in the EPOW code field (lower nibble of EPOW byte 0) is 5, RTAS should return value to O/S ASAP in order to meet 4ms timing requirement. Fill out the error log as per CHRP 1.0. Clear the EPOW register (writing 0x00) after read. There is no need to read ISA 0x854 or appending FRU location code.

4) If the value in the EPOW code field (lower nibble of EPOW byte 0) is NOT 5, read EPOW register byte 1 (ISA 0x854).

5) Log the FRU location code(s) using the information in EPOW byte 1 and high nibble of byte 0. The value of low nibble byte 0 are listed here for reference only.

| Byte-1 | Byte-0 | Location Code(s) |
|--------|--------|------------------|
| 00 | 45 | none |
| 00 | 85 | none |
| 1n | 11 | F(n+1) P2 |
| 1n | 64 | F(n+1) P2 |
| 2n | 32 | V1 P2 |
| 2n | 52 | V1 P2 |
| 3n | 21 | none |
| 3n | 73 | none |
| 1n | 91 | F(n+1) |
| 1n | 14 | F(n+1) |
| 4n | 92 | Vn |
| 4n | 94 | Vn |

Note: n is the sensor ID

6) Fill out the error log. Append both EPOW registers value (byte 1 follow by byte 0) as product-specific log data, to the end of error log.

7) Clear the EPOW registers (writing 0x00 to ISA 0x855 will clear both) after read.

FIG. 4

| Action Code | Value | Description |
|---|---|---|
| EPOW_Reset | 0 | No EPOW event is pending. This action code is the lowest priority. |
| Warn_Cooling | 1 | A non-critical cooling problem exists. An EPOW-aware operating system logs the EPOW information. |
| Warn_Power | 2 | A non-critical power problem exists. An EPOW-aware operating system logs the EPOW information. |
| System_Shutdown | 3 | The system must be shut down. An EPOW-aware operating system logs the EPOW error log information, then schedules the system to be shut down in 10 minutes. |

| Action Code | Value | Description |
|---|---|---|
| System_Halt | 4 | The system must be shut down quickly. An EPOW-aware operating system logs the EPOW error log information, then schedules the system to be shut down in 20 seconds. |
| EPOW_Main_Enclosure | 5 | The system may lose power. The hardware ensures that at least 4 milliseconds of power within operational thresholds is available. An EPOW-aware operating system performs any desired functions, masks the EPOW interrupt, and monitors the sensor to see if the condition changes. Hardware does not clear this action code until the system resumes operation within safe power levels. |
| EPOW_Power_Off | 7 | The system will lose power. The hardware ensures that at least 4 milliseconds of power within operational thresholds is available. An EPOW-aware operating system performs any desired operations, then attempts to turn system power off. An EPOW-aware operating system does not clear the EPOW interrupt for this action code. This action code is the highest priority. |

FIG. 5

| Environmental and Power Warning Event Log Format, Bytes 12-39 | | |
|---|---|---|
| Byte | Bit(s) | Description |
| 12-15* | | EPOW Sensor Value (low-order 4 bits contain the action code) |
| 16 | 0 | 1 = EPOW detected by a defined sensor (see bytes 20-35) |
| | 1 | 1 = EPOW caused by a power fault (see byte 17) |
| | 2:3 | Reserved |
| | 4 | 1 = EPOW warning due to loss of redundancy (For example, single failure in a group of N+1 power supplies, fans, etc.) |
| | 5:7 | Reserved |
| 17 | 0 | 1 = General EPOW power fault due to an unspecified cause |
| | 1 | 1 = EPOW power fault specifically due to loss of power source |
| | 2 | 1 = EPOW power fault specifically due to internal power supply failure |
| | 3 | 1 = EPOW power fault specifically due to manual activation of power-off switch |
| | 4:7 | Reserved |
| 18-19 | | Reserved |
| 20-23* | | Token number of specific sensor causing the EPOW condition (If no CHRP-defined sensor caused the EPOW condition, this and the following values are set to 0. For example, a power loss condition currently does not have a defined CHRP sensor token.) |
| 24-27* | | Index number of specific sensor causing the EPOW condition |
| 28-31* | | Sensor value |
| 32-35* | | Sensor status (Status return value that would be returned from a get-sensor-state call) |
| 36-39 | | Reserved |
| Note: Some of these elements are sensitive to Endian orientation, and are indicated by an * in the Byte column. Byte 0, Bit 6 of the log structure indicates the Endian orientation. | | |

FIG. 6

| Table 34. Environmental and Power Warning Codes | | | | |
|---|---|---|---|---|
| Byte 1 | | Byte 0 | | Description |
| Sensor Type | Sensor ID | Error Type | Action Code | |
| 0x0 | 0x0 | 0x0 | 0x0 | Normal Operation |
| 0x0 | 0x0 | 0x0 | 0x1 | Cooling Alert |
| 0x1 | 0x0 | 0xn | 0x1 | Slow Fan: n is Fan Number; 1-4 for Wildcat |
| 0x3 | 0x1 | 0x2 | 0x1 | CPU Over Temperature Alert |
| 0x3 | 0x2 | 0x2 | 0x1 | I/O Over Temperature Alert |
| 0x0 | 0x0 | 0x0 | 0x2 | Power Alert |
| 0x2 | 0x0 | 0x3 | 0x2 | + 5V Over Voltage Alert |
| 0x2 | 0x0 | 0x5 | 0x2 | + 5V Under Voltage Alert |
| 0x2 | 0x1 | 0x3 | 0x2 | + 3.3V Over Voltage Alert |
| 0x2 | 0x1 | 0x5 | 0x2 | + 3.3V Under Voltage Alert |
| 0x2 | 0x3 | 0x3 | 0x2 | + 12V Over Voltage Alert |
| 0x2 | 0x3 | 0x5 | 0x2 | + 12V Under Voltage Alert |
| 0x2 | 0x4 | 0x3 | 0x2 | - 12V Over Voltage Alert |
| 0x2 | 0x4 | 0x5 | 0x2 | - 12V Under Voltage Alert |
| 0x2 | 0x5 | 0x3 | 0x2 | + 5V Standby Over Voltage Alert |
| 0x2 | 0x5 | 0x5 | 0x2 | + 5V Standby Under Voltage Alert |
| 0x0 | 0x0 | 0x0 | 0x3 | Slow Shutdown Request |
| 0x3 | 0x1 | 0x7 | 0x3 | CPU Critical Over Temperature - Slow Shutdown Request |
| 0x3 | 0x2 | 0x7 | 0x3 | I/O Critical Over Temperature - Slow Shutdown Request |
| 0x0 | 0x0 | 0x0 | 0x4 | Fast Shutdown Request |
| 0x1 | 0xn | 0x6 | 0x4 | Locked Fan - Fast Shutdown Request: n is Fan Number (1-4) |
| 0x0 | 0x0 | 0x0 | 0x5 | Power Loss |
| 0x2 | 0x0 | 0x4 | 0x5 | AC (outlet) - Power Loss |
| 0x2 | 0x0 | 0x8 | 0x5 | Power Button Request - Power Loss |
| 0x1 | 0xn | 0x9 | 0x1 | Loss of One Redundant Fan/Blower, Where n is Fan/Blower ID |
| 0x1 | 0xn | 0x1 | 0x4 | Loss of Second Fan/Blower |
| 0x4 | 0xn | 0x9 | 0x2 | Loss of One Redundant Power Supply, Where n is Power Supply ID |
| 0x4 | 0xn | 0x9 | 0x4 | Loss of One Redundant Power Supply where One Fan has Failed |

FIG. 8

ENVIRONMENTAL AND POWER ERROR HANDLING EXTENSION AND ANALYSIS FOR SYSTEMS WITH REDUNDANT COMPONENTS

CROSS-REFERENCE TO RELATED APPLICATION

The present invention is related to U.S. Pat. No. 5,878,377, entitled "Environmental and Power Error Handling Extension and Analysis," filed Apr. 10, 1997, and assigned to the assignee of the present invention.

FIELD OF THE INVENTION

This invention relates generally to the field of computer systems, and more particularly, to techniques for detecting environmental and power problems, including those of redundant system components, which can have an adverse effect on the operation of the computer system. Still more particularly, the invention relates to a method and apparatus for generating environmental and power warnings and providing this information to computer service repair personnel for fast and accurate diagnosis and correction of environmental and power errors.

BACKGROUND OF THE INVENTION

Complex computer systems require stable environmental and power conditions to ensure proper operation. When site environmental problems occur, such as air conditioning malfunctions, restricted air flow around the computer system, a/c power glitches, etc., the computer system may not properly perform, resulting in injury to important data stored on the computer by logical damage, e.g., disk sectors data corruption, or even complete hardware malfunction. To keep pace with increasing market demand for higher reliability and availability in computer systems, newer systems are being designed with redundant hardware components. For example, systems are being designed with redundant power supply and cooling components (i.e., fans/blowers). With such redundant components, the system is expected to maintain operations in the event of a power supply or fan/blower failure.

Typical, non-redundant systems are provided with various sensors for detecting environmental and power problems and providing appropriate error messages to inform users of these problems. Also, these error messages are used by computer repair service personnel to diagnose and correct the problem. One exemplary environmental and power warning system is provided in the PowerPC Common Hardware Reference Platform, (CHRP), and RS/6000 Systems to inform the operating system of these types of events. The Common Hardware Reference Platform is described in detail in "PowerPC Microprocessor Common Reference Platform: A System Architecture," ISBN 1-558603948, available from IBM.

In general, the CHRP employs a variety if sensors which detect and measure environmental conditions. If the measurements of these conditions exceed certain threshold values, then data reflecting the conditions is written into an environmental and power warning register (EPOW register) in the system. In the CHRP architecture, the data written into the EPOW register is referred to as an action code. However, the complexity of redundant power and cooling components cannot be adequately handled with the standard EPOW arrangement. Redundant failures need to be reported with an appropriate level of severity without restricting the ability to power-up and use the system. Further, multiple levels of error reporting are required to handle the potential of more than one failure occurring.

It is, therefore, one object of the present invention to provide an improved environmental and power warning system which addresses the difficulties associated with a system having redundant power and cooling components. Additional objects and advantages of the present invention will become apparent in view of the following disclosure.

SUMMARY OF THE INVENTION

The present invention provides aspects for detecting environmental faults in redundant components of a computer system. In an exemplary method aspect, the method includes monitoring system environment conditions, including a status for redundant power supply and cooling components. The method further includes registering a failure condition with an appropriate error type when a monitored system environment condition exceeds a design threshold, and utilizing the registered failure condition as data in an architected error log.

Through the present invention, a methodology for handling redundant failure situations is provided. The methodology integrates with and extends current EPOW error handling architectures. Further, the present invention provides additional power/cooling failure isolation capability for service personnel. These and other advantages of the aspects of the present invention will be more fully understood in conjunction with the following detailed description and accompanying drawings.

BRIEF DESCRIPTION OF THE DRAWINGS

FIG. 4 illustrates a pseudo-code example of an RTAS function according to an embodiment of the invention.

FIG. 5 illustrates a table of EPOW interrupt action codes according to an embodiment of the invention.

FIG. 6 illustrates an error code log according to an embodiment of the invention.

FIG. 8 illustrates a table of possible EPOW codes, including those for redundant component failures, according to still a further embodiment of the invention.

DETAILED DESCRIPTION OF THE INVENTION

The present invention relates to detecting environmental and power problems, including those of redundant system components, which can have an adverse effect on the operation of the computer system. The following description is presented to enable one of ordinary skill in the art to make and use the invention and is provided in the context of a patent application and its requirements. Various modifications to the preferred embodiment and the generic principles and features described herein will be readily apparent to those skilled in the art.

The present invention will be described with respect to embodiments adapted to the exemplary CHRP architecture. In other embodiments, the invention is readily adaptable to a wide variety of computer architectures as a matter of design choice.

Figure 1:
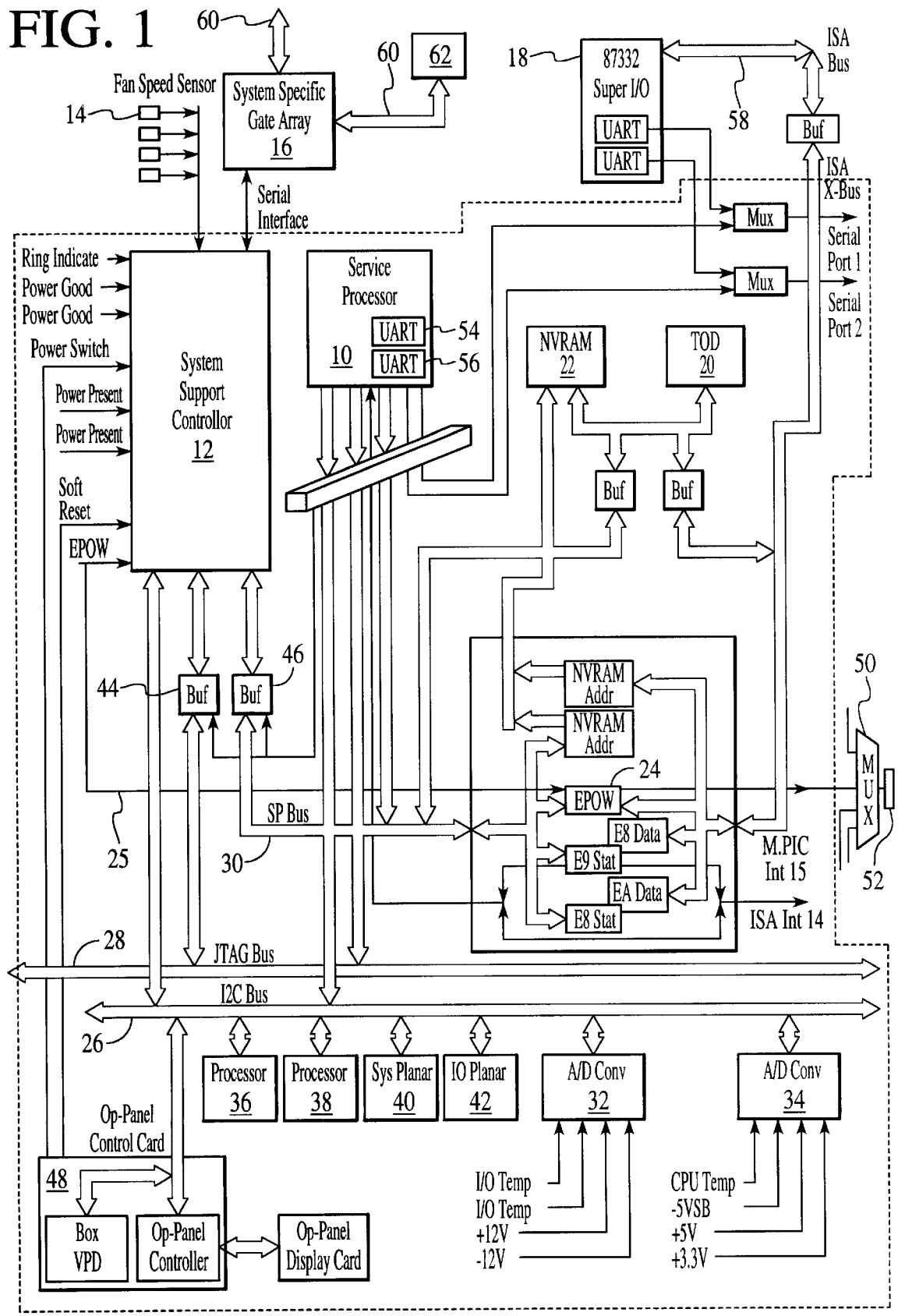
FIG. 1 illustrates a block diagram of a processing system useful in accordance with one embodiment of the invention.

Referring now to FIG. 1, an embodiment of the invention will be described which provides error and event notification of redundant power and cooling components. FIG. 1 shows an apparatus useful for providing environmental and power warnings to a main processor according to an embodiment of the invention. In this embodiment, there is provided a service processor 10 (SP), having its own on-board memory, and a system support controller 12 (SSC). SP 10 and SSC 12 are coupled to various other devices, such as system specific gate array 16, operator panel control card 48, I/O logic 18, RAM 22 and time of day logic 20. These resources are primarily to allow communication to other resources in the computer system. For example, gate array 16 allows communication to local buses 60 to access other resources, such as additional processors 62. I/O logic 18 accesses industry standard architecture (ISA) bus 58 and passes data through serial ports 1 and 2. Serial ports 1 and 2 are multiplexed with UARTs 54 and 56 on the service processor 10 to allow serial communication between service processor 10 and other devices coupled to the port. The operation of these additional resources is not critical to an understanding of the invention and they will not be described in further detail herein.

Environmental and power information for the system illustrated in FIG. 1 is provided through various sensors, such as fan speed sensors 14 and temperature and voltage sensors, coupled to analog to digital converters 32 and 34. The selection of actual sensors for use in the invention is not critical. Any sensors which are accurate over the allowable operating range of the computer system for temperature, voltage, etc., and which provide a suitable digital or an analog signal, which may be digitized by suitable converters, may be used. In the embodiment shown, the temperature and voltage sensors are placed at various physical locations in the computer system where they detect the temperature at various I/O locations, the CPU temperature, or various system voltage rails. After the signals transmitted from the sensors are converted to digital data by A/D converters 32 and 34, it is provided to the I²C bus 26. A more detailed understanding of the I²C bus operation is not critical to understanding the present invention. It will be noted that the I²C bus also carries data from other system resources such as processors 36, 38, 40 and 42.

Data from fan speed sensors 14 is provided to system support controller 12 which then passes this data to the I²C bus 26. Service processor 10 is coupled to the I²C bus. Thus, all data provided by the sensors is available to service processor 10 by the I²C bus. Service processor 10, as well as system support controller 12, are also coupled to the service processor bus 30. Service processor bus 30 allows access to EPOW register 24 as will be described in greater detail further herein. Further input to support controller 12 are signal lines, Power Good and Power Present, from appropriate power supply sensors, the details of which are not included in the present invention. Preferably, a Power Good status line and a Power Present status line are provided for each power supply in a system to indicate the operational status and presence of the power supplies. For illustrative purposes, a simple 1+1 redundant power supply system is described. Thus, two Power Good and Power Present signal lines are shown in FIG. 1. Of course, greater numbers of power supplies may be used for further redundancy, if desired.

EPOW register 24 is coupled to interrupt line 25 which, in this particular implementation, is referred to as MPIC interrupt 15. This interrupt line 25 is then passed to multiplexer 50 and finally to main processor 52. The interrupt transmitted over interrupt signal line 25 is sometimes referred to herein as an EPOW interrupt. All EPOW conditions are reported to the operating system of the main processor 52 via an EPOW interrupt. In one embodiment, the EPOW interrupt is generated by writing a non-zero value into EPOW register 24 as will be described in greater detail hereinbelow.

Figure 2:
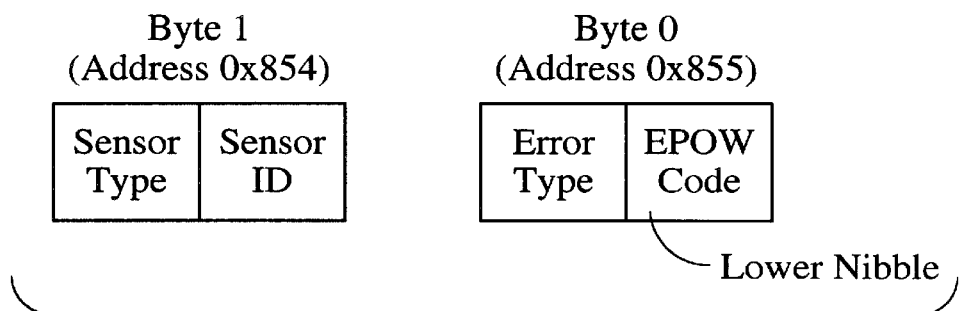
FIG. 2 illustrates a diagram illustrating the contents of the EPOW register according to an embodiment of the invention.

FIG. 2 shows an example of an EPOW register according to an embodiment of the invention. The EPOW register comprises two bytes, byte 0 and byte 1. In the specific embodiment, byte 0 is located at ISA address 0×855 and byte 1 is located at 0×854. The lower nibble of ISA I/O address 0×855 register contains the EPOW action code at the time of the EPOW interrupt. The value is maintained until it is cleared by the interrupt handler executed by the main processor. A write to the lower nibble of this register with a non-zero value by the platform causes an EPOW interrupt to be issued to the main processor.

The upper nibble of EPOW byte 0 contains the error type. The lower nibble of EPOW byte 1 contains the environmental sensor identifier (ID) code, and the upper nibble contains the sensor type. In one specific embodiment, the definition of each field is as follows:

EPOW Code: Same as CHRP architected definition.

Error Type: A 4-bit hexadecimal value which identifies the cause of EPOW error condition. The values in this field are defined as follows:

0=Cause of error cannot be identified

1=Slow fan

2=Over temperature

3=Over voltage

4=Loss of AC power-power button moved to off position

5=Under voltage

6=Locked fan rotor

7=Maximum temperature exceeded

8=Loss of AC power from wall outlet

9=Non-critical loss of redundant (N+1) power supply, fan, or blower, as determined by Sensor Type A–F=Reserved Sensor ID: A 4-bit hexadecimal value which identifies the specific instance of each sensor type within the platform Sensor Type: A 4-bit hexadecimal value which identifies the types of sensor in the platform. In this embodiment, the classifications are as follows:

0=Not Applicable or Undefined

1=Fan Speed Sensor

2=Voltage Sensor

3=Temperature Sensor

4=Power Supply Sensor

A–F=Reserved

Figure 3:
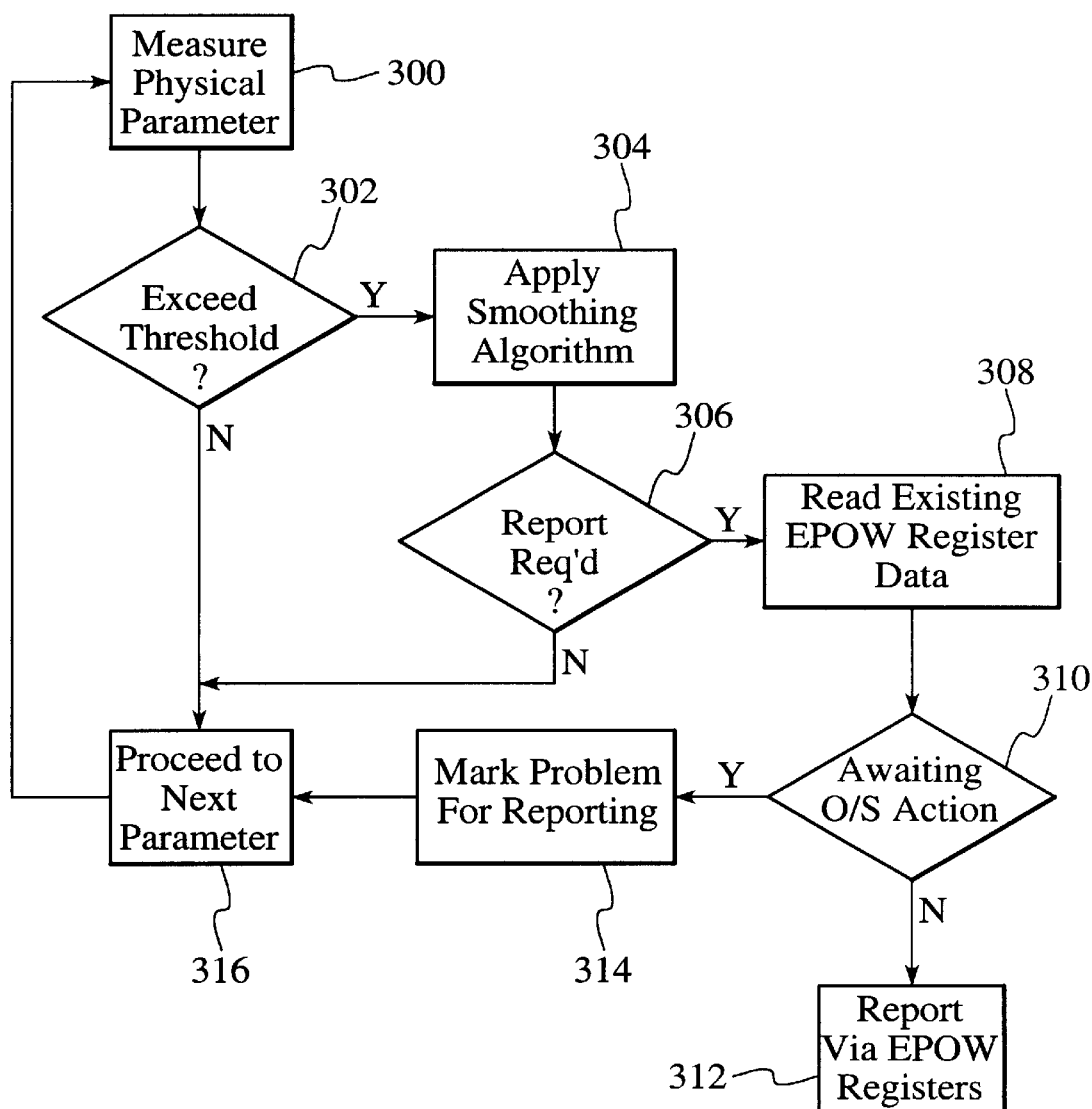
FIG. 3 illustrates a flow chart for an environmental fault detection routine according to one embodiment of the invention.

FIG. 3 is a flow chart illustrating the operation of the service processor 10 as it retrieves the data from the sensors on the I²C bus 26. In step 300, the service processor 10 measures the physical parameter of an environmental condition of the computer system, such as a supply voltage, temperature, fan speed, etc., by retrieving the data for a particular sensor associated with the measurement from the I²C bus 26. Next, service processor 10 proceeds to step 302 where it determines whether the physical parameter exceeds a predetermined threshold. In one embodiment, service processor 10 accesses a memory which stores acceptable limits for each physical parameter associated with each sensor.

In many instances, there will be more than one predetermined threshold for a particular measurement. For example, a temperature measurement may be provided with a maximum temperature, and a minimum temperature. Additionally, within the maximum and minimum range, there may be other ranges indicating the severity of the problem. For example, there may be two temperature limits associated with an over temperature condition. When the first limit is reached the system may signal that the problem is only moderately bad and warn the user to take some action to improve system cooling. When the second limit is reached, the system may so inform the operator and cause a system shutdown before the exceeding temperature causes physical damage to the computer system, possibly resulting in a loss of important data stored in the system. Of course, the selection of such limits is a matter of design choice, and will be apparent to one of skill in the art in view of specific parameters which are system dependent.

For the simple case of a 1+1 redundant power supply system, the service processor 10 monitors the state of each power supply via the system support controller 12. As previously described, each power supply state is represented by a Power Present and Power Good signal. Direct monitoring of the two internal fans within a power supply is not performed by the service processor 10, but when either internal fan fails, the power supply fails. When a single power supply failure occurs, both internal fans in that power supply are stopped, which results in a reduced air flow to the disk enclosures that are cooled by four additional fans. The service processor 12 further monitors the rotational speed of the four disk fans (via fan speed sensors 14, FIG. 1), one CPU fan, and 2 CEC blowers, e.g., from a suitable monitoring and control mechanism. The disk and CEC/CPU cooling paths are independent of each other, so that a failure in one cooling path does not impact the other cooling path.

If the measured value is within the predetermined threshold limits, then there is no environmental condition to report to the main processor and the service processor 10 proceeds to step 316 and selects the next sensor, or measurement parameter, from which to retrieve data Flow then proceeds back to step 300 as before.

However, if in step 302, service processor 10 determines that the threshold is exceeded for a particular measurement, then it proceeds to step 304 where, in this embodiment, a smoothing algorithm is applied. The purpose of the smoothing algorithm is to prevent redundant reporting. Thus, the service processor 10 will wait in the event of multiple occurrences and will not report a particular problem if it has already been reported or if the measurement is wavering between good and bad values and would cause numerous, redundant errors. In other words, the values are written only once by service processor 10 when a specific platform environmental condition exceeds its design threshold. The service processor 10 writes a new EPOW value to the register 24 when: (1) the environmental condition, which was reported earlier, returned to normal then exceeds its design threshold again, (2) the environmental condition, which was reported earlier, exceeds the next critical level of design threshold, or (3) a new environmental condition exceeds its design threshold.

After the smoothing algorithm has been applied, service processor 10 then proceeds to step 306 to determine whether there is still a need to report the condition. If not, flow proceeds to step 316 as before. However, if the report is required, then service processor proceeds to step 308 and reads the existing value from the EPOW register.

In step 310, service processor 10 reviews the data retrieved from EPOW register to determine whether any error is currently awaiting action by the operating system of the main processor. In one embodiment, as will be described in greater detail herein, the operating system clears the EPOW register after reading the data contained there. Thus, in this embodiment, if the EPOW register is not empty, the system proceeds to step 314 where it marks the problem for reporting after a certain period of time. This prevents overwriting of an error currently being serviced. After the problem is marked, the flow proceeds to step 316 as before.

However, if in step 310 service processor 10 determines that the operating system is not aware of the problem, then it proceeds to step 312 where it reports the problem to the main processor 52 by writing data into the EPOW register 24 as described earlier. Once the EPOW register is written in step 312, an interrupt is generated on interrupt line 25 and passed to the main processor 52 via multiplexer 50. Preferably, an action code is created for an interrupt, as described hereinbelow. A table of suitable action codes in illustrated in FIG. 5.

For a situation where both redundant power supplies are present, and one supply fails, the service processor handles the condition as follows. If all four disk fans are still operational, an EPOW interrupt is created with an action code 2, error type 9. The service processor 10 also increases the rotational speed of all disk fans. If the second power supply also fails before the first supply is repaired, an EPOW interrupt is created with an action code 5. For the condition where there is already one disk fan failure when the power supply fails, an EPOW interrupt with action code 4, error type 9, is created.

When a fan/blower failure occurs, the service processor 10 handles the possible conditions as follows. If one disk fan fails and both power supplies are operational, an EPOW interrupt is created with an action code 1, error type 9. The rotational speed of all remaining disk fans is increased. For the condition of one of the four disk fans failing and a redundant power supply failing, an EPOW interrupt with action code 4, error type 1 or 6, is created, the error type depending upon the fan/blower failure condition. For the condition that two disk fans fail (e.g., a second fan failure before a first fan failure is repaired), an EPOW interrupt with action code 4, error type 1 or 6, is created, the error type depending upon the failure conditions. When one of the CEC blowers fails and the CPU fan is running normally, or the CPU fan fails and both CEC blowers are running normally, an EPOW interrupt with an action code 1, error type 9, is created. The rotational speeds of the blower(s)/ CPU fan are increased, appropriately. When the two CEC blowers fail, or the CPU fan and one of the CEC blowers fails, an EPOW interrupt with action code 4, error type 1 or 6, is created, the error type depending upon the failure conditions.

During the boot phase of the firmware, if there is an EPOW action code 1 or 2 caused by a redundant power/ cooling error type, the service processor 10 defers the EPOW interrupt until it receives a successful boot status from the boot firmware. A successful boot status indicates transfer of control to the operating system, which logs and reports the error but continues operation. For other more critical EPOW conditions, the service processor 10 creates an immediate EPOW interrupt. The boot firmware services the EPOW interrupt at the end of its boot phase by sending a power off command to the service processor 10.

Numerous ways for handling interrupts are possible, as is well understood by those of skill in the art. However, for purposes of illustration, one version of the invention will be described which performs interrupt handling according to the CHRP architecture described earlier. In this embodiment, an operating system, for example AIX, is running on the main processor 52. Addresses to the interrupt handling routines are provided to the operating system. The actual interrupt handling routines are stored in firmware on the system. These routines are stored as part of the run time abstraction service (RTAS) which is defined by the CHRP architecture. When the main processor 52 receives an EPOW interrupt, it calls the RTAS routines to perform the required handling. In one specific embodiment, the RTAS comprises a routine shown in pseudo code in FIG. 4. This is referred to as the check-exception routine which also performs a read of the EPOW register byte 0 and, if required, EPOW register byte 1.

When the RTAS functional routine is called by the operating system, in general, the flow is as follows. First, EPOW register byte 0 is read. This data represents the EPOW action code. The EPOW action code and the data in byte 1 is placed in an error log by the operating system error log facility. In a preferred embodiment, the error log is architected such that the RTAS decodes the information in the error register and provides an error log, where each bit of the error log represents status information. FIG. 6 illustrates an example of an architected error log format according to an embodiment of the present invention.

Referring again to FIG. 4, if the value in the EPOW code field, i.e., lower nibble of EPOW byte 0, is 5, then the RTAS returns that value to the operating system quickly in order to meet the 4 millisecond timing requirement specified in the CHRP architecture.

More specifically, referring again to FIG. 1, Class 5 action codes for 'AC power loss' and 'Power-off' switch are coupled directly from the detection source to the main processor 52. These are urgent power-off warnings that do not allow time for service processor 10 action.

Figure 7:
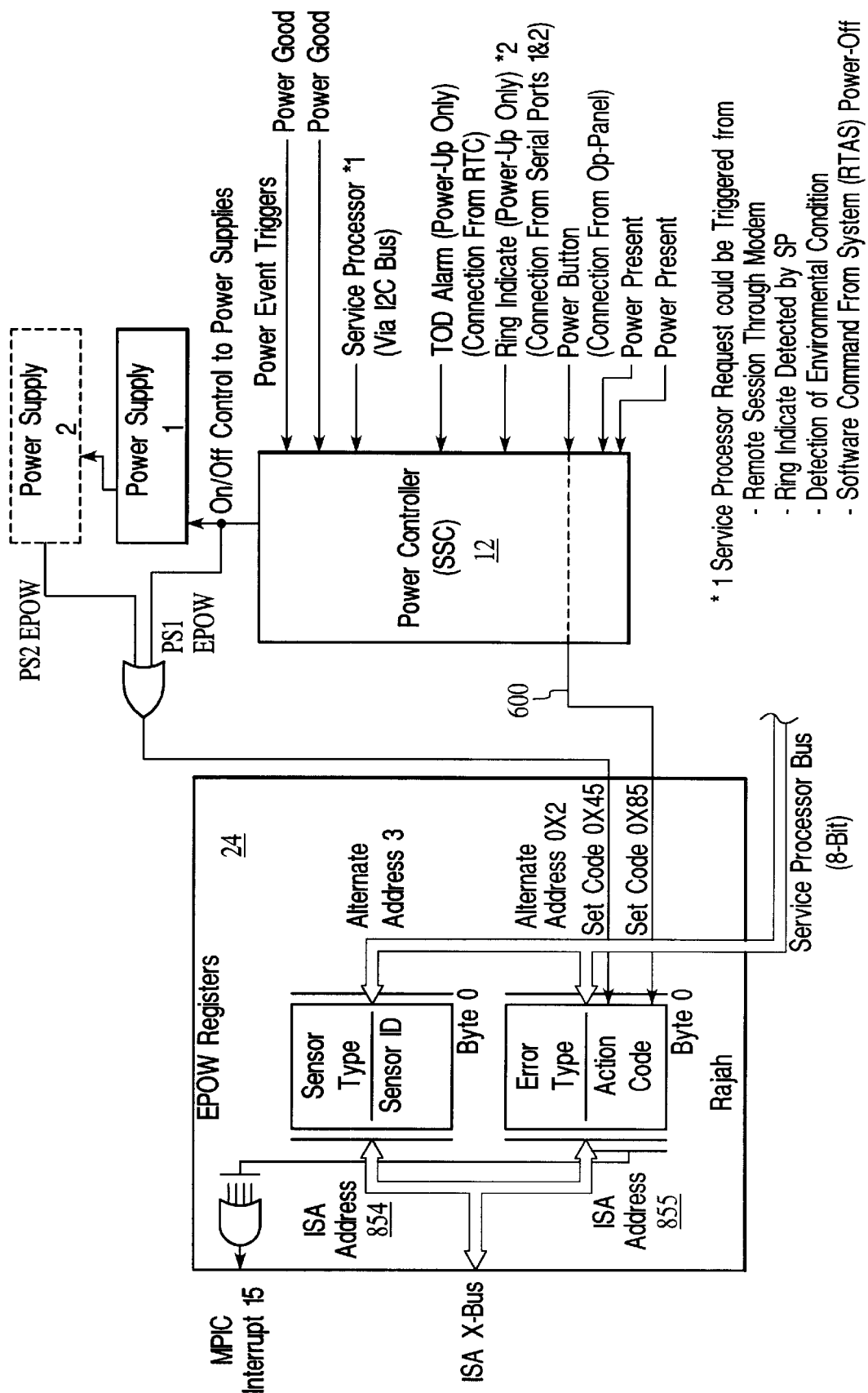
FIG. 7 illustrates a block diagram illustrating the operation of an EPOW interrupt according to an embodiment of the invention.

FIG. 7 illustrates the operation of class 5 action codes in even greater detail. Specifically, system controller 12 receives various signals from other resources related to power events in the system. For these types of signals, SSC 12 does not write data to I²C bus 26, shown in FIG. 1, to be later read by service processor 10. Rather, SSC 12 is coupled directly to the EPOW registers 24 via signal line 600. Of course, as discussed earlier, once data is written into the EPOW register 24, an interrupt to the main processor 52 is generated.

In a further embodiment, the EPOW action code 5 is written to the register by the power controller hardware. If this environmental condition persists, power controller hardware will maintain the value and a 0×00 write to the register 24 will not clear it. This register will be cleared only when the environmental condition has returned to normal and a 0×00 is written later by another RTAS function.

If the value in the EPOW code field is not 5, then the RTAS reads the EPOW register byte 1 (ISA 0×854). FIG. 8 is a table illustrating choices of sensor types, sensor ID_s, error types and action codes according to one embodiment of the invention. Thus, all other action codes are written by the service processor 10 to the EPOW register 24 as result of conditions detected by polling the environmental sensors. The service processor 10 reads the contents of the EPOW register 24 before writing new data to assure that data is not lost or that higher priority codes are not overwritten by lower priority codes.

Once the error log is written, the operating system then invokes an error log analysis (ELA) routine which analyzes the cause, or causes, of the EPOW condition based on the extended error information in the error log. Since the RTAS functional routine provides an architected error log, the analysis involves a table look-up type analysis of the error log data. For example, if bit 4 of byte 16 in the error log is set or '1', the warning event was due to a loss of redundancy. The architected error log thus provides a standard format and interface between the RTAS and the operating system. Further, when the EPOW condition occurs, the ELA provides additional error messages to a user to inform them of the potential root cause(s) and with suggestions for corrective actions for site environmental problem(s) or with a call to a computer manufacturer for service. The ELA can also be used by the service personnel to isolate the failing power or cooling hardware components.

Finally, the EPOW registers are cleared by the RTAS by writing a 0 to ISA 0×855. In the present embodiment, this will clear both bytes of the EPOW register. The service processor 10 then continues to poll the sensors and write new data to the EPOW register in the event an environmental condition is detected, as described in detail above.

Although the present invention has been described according to specific embodiments involving the CHRP architecture, it will be understood by those skilled in the art that the invention admits to numerous other embodiments involving other architectures which may be substituted for the CHRP architecture as a matter of design choice. Thus, the above embodiments are not intended to be limitative, for various changes in form and detail are considered to be within the spirit and scope of the present invention. All publications referenced herein are hereby incorporated by reference as though set forth in full.

What is claimed is:

1. A method for detecting environmental faults in redundant components of a computer system, the method comprising:

monitoring system environment conditions, including a status for redundant power supply and cooling components;

registering a failure condition with an appropriate error type when a monitored system environment condition exceeds a design threshold; and utilizing the registered failure condition as data in an architected error log, wherein a standard EPOW (environmental and power warning) arrangement is extended to handle the complexity of the redundant power and cooling components being monitored.

2. The method of claim 1 wherein the step of monitoring further comprises monitoring a power good and a power present status line for each redundant power supply.

3. The method of claim 1 wherein the step of registering further comprises registering a failure in a redundant component with an error for a non-critical loss of a redundant power supply, fan, or blower.

4. The method of claim 3 wherein the step of registering further comprises registering an appropriate sensor error.

5. The method of claim 1 wherein the step of utilizing further comprises decoding a register value and setting appropriate bit(s) of the architected error log based on the decoding.

6. The method of claim 1 further comprising analyzing a cause of the registered failure condition based on the architected error log.

7. The method of claim 6 wherein the step of analyzing further comprises performing a table look-up analysis based on data in the architected error log.

8. The method of claim 7 wherein analyzing further comprises identifying a particular component of the redundant components causing the registered failure condition.

9. The method of claim 1 wherein registering a failure condition further comprises determining criticality of action required based on an operation condition of each redundant component when the failure condition occurs.

10. An apparatus for detecting environmental faults of redundant components in a computer system, the apparatus comprising:
- a system support controller for receiving status data of redundant system components;
- a service processor coupled to the system support controller for monitoring system environment conditions based on the status data and registering a failure condition with an appropriate error type when a monitored system environment condition exceeds a design threshold; and
- a main processor coupled to the service processor for utilizing the registered failure condition as data in an architected error log, wherein a standard EPOW (environmental and power warning) arrangement is extended to handle the complexity of the redundant power and cooling components being monitored.

11. The apparatus of claim 10 wherein the system support controller receives status data for redundant power supplies and redundant cooling components.

12. The apparatus of claim 11 wherein the status data for the redundant power supplies further comprises signals representative of power being good and power being present for each redundant power supply.

13. The apparatus of claim 11 wherein the redundant cooling components further comprise redundant fans and blowers.

14. The apparatus of claim 10 wherein the service processor further registers a failure in a redundant component with an error for a non-critical loss of a redundant power supply, fan, or blower.

15. The apparatus of claim 10 wherein the service processor further registers an appropriate sensor error.

16. The apparatus of claim 10 wherein the main processor further decodes a register value and sets appropriate bit(s) of the architected error log based on the decoding.

17. The apparatus of claim 10 wherein the main processor further analyzes a cause of the registered failure condition based on the architected error log.

18. The apparatus of claim 17 wherein the main processor further performs a table look-up analysis based on the data in the architected error log.

19. The apparatus of claim 10 wherein the main processor further identifies a particular component of the redundant components causing the registered failure condition.

20. The apparatus of claim 10 wherein the service processor further determines criticality of action required based on an operation condition of each redundant component when the failure condition occurs.

21. A method for supporting detection of environmental faults of redundant components in a computer system, the method comprising:
- expanding an error type definition for loss of a redundant component, the redundant component including one of a power supply, fan, and blower;
- expanding a sensor type definition for a power supply sensor; and
- utilizing the error type definition and sensor type definition as registered data for a failure condition in redundant system components.

22. The method of claim 21 wherein utilizing further comprises forming an architected error log.

23. The method of claim 22 wherein the architected error log identifies an error and source of a registered failure condition.

* * * * *